US012502854B2

(12) United States Patent
Costle (10) Patent No.: US 12,502,854 B2
(45) Date of Patent: Dec. 23, 2025

(54) TIRE REPAIR SYSTEM (71) Applicant: Illinois Tool Works Inc., Glenview, IL (US)

(72) Inventor: Carey Costle, Tucson, AZ (US)

(73) Assignee: Illinois Tool Works Inc., Glenview, IL (US)

( * ) Notice: Subject to any disclaimer, the term of this patent is extended or adjusted under 35 U.S.C. 154(b) by 97 days.

(21) Appl. No.: 18/239,499

(22) Filed: Aug. 29, 2023

(65) Prior Publication Data
US 2024/0247648 A1 Jul. 25, 2024

Related U.S. Application Data (60) Provisional application No. 63/410,357, filed on Sep. 27, 2022.

(51) Int. Cl.
*B29C 73/16* (2006.01)
*B60S 5/04* (2006.01)

(52) U.S. Cl.
CPC .............. *B29C 73/166* (2013.01); *B60S 5/04* (2013.01)

(58) Field of Classification Search
CPC . B29C 3/16; B29C 3/163; B29C 3/166; B60S 5/04
See application file for complete search history.

(56) References Cited

U.S. PATENT DOCUMENTS

| | | | | |
|---|---|---|---|---|
| 3,718,238 A * | 2/1973 | Hazard | ................ | B65D 47/305 222/536 |
| 3,786,964 A * | 1/1974 | Landen | ................ | B65D 47/305 222/536 |
| 4,081,113 A * | 3/1978 | Hazard | ................ | B65D 47/305 222/536 |

(Continued)

FOREIGN PATENT DOCUMENTS

| | | |
|---|---|---|
| AR | 103628 | 5/2017 |
| AR | 103629 | 5/2017 |

(Continued)

OTHER PUBLICATIONS

"Slime 50158 Flat Tire Repair Kit, Smart Spair Ultra, All-in-One Solution, Repairs and Inflates, Car/Trailer, 10 Min Fix" Mar. 12, 2024, product listing, retrieved Oct. 10, 2024, retrieved from <URL:https://www.amazon.com/Slime-50158-Solution-Repairs-Inflates/dp/B0CXTP2F3G/?th=1> (Year: 2024).

(Continued)

*Primary Examiner* — Nicolas A Arnett
(74) *Attorney, Agent, or Firm* — McAndrews, Held & Malloy, Ltd.

(57) ABSTRACT

A tire repair system for inflating or repairing a tire. The tire repair system includes a carrying case, an inflation system, a sealant delivery system, and a hose attachment. The inflation system positioned in or integrated with the carrying case, wherein the inflation system is configured to provide compressed air. The sealant delivery system positioned in or (Continued)

integrated with the carrying case, wherein the sealant delivery system is configured to mix a tire sealant with the compressed air. The hose attachment engages the tire and delivers the tire sealant and the compressed air to the tire.

15 Claims, 6 Drawing Sheets

(56) References Cited

U.S. PATENT DOCUMENTS

| | | | | |
|---|---|---|---|---|
| 4,621,984 | A * | 11/1986 | Fussell | F04B 35/06 417/234 |
| 5,104,295 | A * | 4/1992 | Wong | B60S 5/046 73/705 |
| 5,156,853 | A * | 10/1992 | Werner | B32B 17/10963 425/12 |
| 5,381,836 | A * | 1/1995 | Braatz | A61M 16/183 141/366 |
| 5,427,145 | A * | 6/1995 | Grabenkort | A61M 16/183 604/905 |
| D369,240 | S * | 4/1996 | Newby, Sr. | D3/276 |
| 5,687,777 | A * | 11/1997 | Dobson | A61M 16/183 141/366 |
| D425,913 | S * | 5/2000 | Bonzer | D15/7 |
| 6,789,581 | B2 * | 9/2004 | Cowan | B29C 73/166 141/38 |
| D508,058 | S * | 8/2005 | Wu | D15/7 |
| 7,789,110 | B2 * | 9/2010 | Marini | B60S 5/046 141/38 |
| 7,798,183 | B2 * | 9/2010 | Cegelski | B29C 73/166 141/38 |
| 7,886,783 | B2 * | 2/2011 | Rindy | A61M 16/183 141/366 |
| 8,251,105 | B2 * | 8/2012 | Lolli | B60S 5/046 141/351 |
| 8,251,106 | B2 * | 8/2012 | Lolli | B29C 73/166 141/38 |
| 8,453,683 | B2 * | 6/2013 | Yoshida | B29C 73/166 141/105 |
| 8,459,150 | B2 * | 6/2013 | Yoshida | B29C 73/166 81/15.3 |
| 8,596,310 | B2 * | 12/2013 | Senno | B29C 73/166 141/330 |
| 8,631,840 | B2 * | 1/2014 | Lolli | B60S 5/046 141/351 |
| 8,752,595 | B2 * | 6/2014 | Marini | B29C 73/166 141/38 |
| 8,857,477 | B2 * | 10/2014 | Lolli | B60S 5/043 141/38 |
| D719,352 | S * | 12/2014 | Shitrit | D3/905 |
| 8,997,802 | B2 * | 4/2015 | Lolli | B60S 5/00 141/382 |
| 9,061,471 | B2 * | 6/2015 | Marini | B29C 73/166 |
| 9,168,798 | B2 * | 10/2015 | Eckhardt | B60S 5/043 |
| 9,221,221 | B2 * | 12/2015 | Lolli | B60S 5/046 |
| 9,272,587 | B2 * | 3/2016 | Taniguchi | B60S 5/04 |
| D785,938 | S * | 5/2017 | Ou | D3/905 |
| 9,868,420 | B2 * | 1/2018 | Chou | F04B 35/04 |
| 9,914,271 | B2 * | 3/2018 | Spindler | B60S 5/04 |
| D841,981 | S * | 3/2019 | Kögel | D3/282 |
| D858,995 | S * | 9/2019 | Chang | D3/273 |
| D873,011 | S * | 1/2020 | Kao | D3/905 |
| 10,786,958 | B2 * | 9/2020 | Lam | B60S 5/04 |
| 10,926,495 | B2 * | 2/2021 | Spindler | B29C 73/025 |
| 11,034,104 | B2 * | 6/2021 | Dowel | B29C 73/166 |
| 11,046,129 | B2 * | 6/2021 | Chou | B60C 29/064 |
| 11,135,792 | B2 * | 10/2021 | Lam | B29C 73/025 |
| 11,400,667 | B2 * | 8/2022 | Hong | B29C 73/166 |
| 11,608,826 | B2 * | 3/2023 | Danielski | B60S 5/046 |
| D998,330 | S * | 9/2023 | Guo | D3/904 |
| 11,745,451 | B2 * | 9/2023 | Chou | F04B 35/06 29/402.18 |
| 11,794,426 | B2 * | 10/2023 | Costle | B29C 73/166 |
| 2007/0221287 | A1 * | 9/2007 | Izumoto | B29C 73/166 141/38 |
| 2010/0108186 | A1 * | 5/2010 | Yoshida | B29C 73/166 141/105 |
| 2011/0011217 | A1 * | 1/2011 | Kojima | B29C 73/166 81/15.2 |
| 2011/0155280 | A1 * | 6/2011 | Eckhardt | B29C 73/166 141/38 |
| 2011/0192492 | A1 * | 8/2011 | Kanenari | B29C 73/166 141/38 |
| 2013/0155657 | A1 * | 6/2013 | Werner | B65D 85/00 206/349 |
| 2014/0209207 | A1 * | 7/2014 | Spindler | B29C 73/166 222/251 |
| 2014/0209208 | A1 | 7/2014 | Taniguchi | |
| 2015/0059921 | A1 * | 3/2015 | Jhou | B29C 73/166 141/38 |
| 2016/0144672 | A1 * | 5/2016 | Wang | B29C 73/166 141/38 |
| 2016/0271892 | A1 * | 9/2016 | Eckhardt | B29C 73/166 |
| 2016/0288434 | A1 * | 10/2016 | Eckhardt | B60S 5/04 |
| 2017/0072648 | A1 * | 3/2017 | Zaum | F04B 49/16 |
| 2017/0173900 | A1 * | 6/2017 | Kawatani | B29C 73/025 |
| 2020/0086595 | A1 * | 3/2020 | Dowel | B29C 73/166 |
| 2020/0391560 | A1 * | 12/2020 | Danielski | B60C 23/002 |
| 2021/0016616 | A1 * | 1/2021 | Chou | B29C 73/166 |
| 2024/0247648 | A1 | 7/2024 | Costle | |

FOREIGN PATENT DOCUMENTS

| | | |
|---|---|---|
| CN | 102673533 A | 9/2012 |
| CN | 203752543 U | 8/2014 |
| CN | 104276151 A | 1/2015 |
| CN | 204278561 U | 4/2015 |
| CN | 208452350 U | 2/2019 |
| CN | 208502970 U | 2/2019 |
| CN | 110131124 A | 8/2019 |
| DE | 10106468 A1 | 8/2002 |
| DE | 102014205067 A1 | 9/2015 |
| DE | 102019217775 A1 | 5/2021 |
| EP | 0972616 A2 | 1/2000 |
| EP | 2103417 A1 | 9/2009 |
| EP | 2163374 A1 | 3/2010 |
| EP | 2196305 B1 | 2/2012 |
| EP | 2295299 B1 | 7/2012 |
| EP | 2058112 B1 | 5/2015 |
| EP | 2807018 B1 | 10/2018 |
| JP | 2006103144 A | 4/2006 |
| WO | 2006038640 A1 | 4/2006 |
| WO | 2009065653 A1 | 5/2009 |

OTHER PUBLICATIONS

"Slime 50159 Flat Tire Repair Kit, Smart Spair Ultra, All-in-one Solution, Repairs and Inflates, Truck/SUV, 15 Min Fix" Mar. 12, 2024, product listing, retrieved Oct. 10, 2024, retrieved from <URL:https://www.amazon.com/Slime-50158-Solution-Repairs-Inflates/dp/B0CXTM01WS/> (Year: 2024).

The extended European search report for Application No. 23198804. 9, dated Mar. 20, 2024, European Patent Office, Germany (9 pages).

Slime Flat Tire Repair Kit, AutoZone—Auto Parts/Suspension, Steering, Tire and Wheel/Tire Maintenance and Repair/Tire Repair Kit, Part #50122, SKU #562272 (9 pages).

Communication pursuant to Article 94(3) EPC for European Application No. 23 198 804.9, dated Jun. 2, 2025, European Patent Office, Germany (5pages).

* cited by examiner

TIRE REPAIR SYSTEM

CROSS-REFERENCE TO RELATED APPLICATION

This application claims the benefit of and priority to U.S. provisional patent application Ser. No. 63/410,357, filed Sep. 27, 2023 and entitled "Tire Repair System". The contents of this application are incorporated herein in its entirety by reference.

BACKGROUND

This present disclosure relates to a tire repair and inflation system and apparatus. For the average motorist, replacing a tire on the side of the road can be daunting and needlessly exposes the motorist to inherent roadside dangers.

One solutions to an emergency flat tire repair is to use an aerosol sealant dispenser that combines a chemical fluid and a propellant. These are usually contained in a can or other type of container. A tube is attached between the can and a tire via a tire valve stem. The fluid is propelled through the valve stem into the tire. When the fluid flows through a tire puncture, the fluid hardens with exposure to air. This forms a repair of the tire. To enhance the seal, a compressed air source can be used to allow proper and safe inflation of the tire. An example integrated compressor-tire sealant injection device with a large mouth sealant container is described in commonly owned U.S. Pat. No. 6,789,581 to David Cowan et al. and U.S. Pat. No. 7,798,183 to James Cegelski and Scott Noble Hickman.

Despite existing solutions, it is desirable to provide a portable two-part system with an integrated compressor device and sealant container that overcomes the limitations of existing tire repair sealants, systems, and devices.

SUMMARY

The present disclosure relates generally to a tire repair and inflation system and apparatus, substantially as illustrated by and described in connection with at least one of the figures, as set forth more completely in the claims.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DESCRIPTION

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," "upper," "lower," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

Disclosed is a portable two-part system with an integrated compressor device and sealant container. In one example, a tire repair system for inflating or repairing a tire comprises: a carrying case; an inflation system positioned in or integrated with the carrying case, wherein the inflation system is configured to provide compressed air; a sealant delivery system positioned in or integrated with the carrying case, wherein the sealant delivery system is configured to mix a tire sealant with the compressed air; and a hose attachment configured to engage the tire and to deliver the tire sealant and the compressed air to the tire.

In some examples, the carrying case includes an upper housing hingedly coupled to a lower housing via one or more hinges. In some examples, the upper housing is transparent. In some examples, the carrying case is formed with an exterior recess to retain a component of the tire repair system. In some examples, the carrying case is formed with a hose attachment recess to retain the hose attachment.

In some examples, the inflation system comprises an electrical plug configured to couple electrically to a 12-volt accessory outlet of a vehicle. In some examples, the carrying case is formed with an electrical plug recess to retain the electrical plug.

In some examples, the inflation system comprises a gauge that is configured to display a pressure of the tire. In some examples, the inflation system comprises a start button. In some examples, the sealant delivery system comprises a reservoir cartridge and a coupling valve. In some examples, the reservoir cartridge is removably coupled via the coupling valve.

In some examples, the tire repair system further comprises a switch configured to disengage the reservoir cartridge from the carrying case. In some examples, the tire repair system further comprises a cutoff valve configured to switch the tire repair system between a first mode of operation and a second mode of operation. In some examples, only compressed air is provided in the first mode of operation and both compressed air and sealant are provided in the second mode of operation.

In some examples, the tire repair system further comprises a rechargeable battery pack positioned in or integrated with the carrying case, wherein the rechargeable battery pack is configured to power the inflation system. In some examples, the inflation system comprises an electrical plug configured to couple electrically to a universal serial bus (USB) port.

Figure 1:
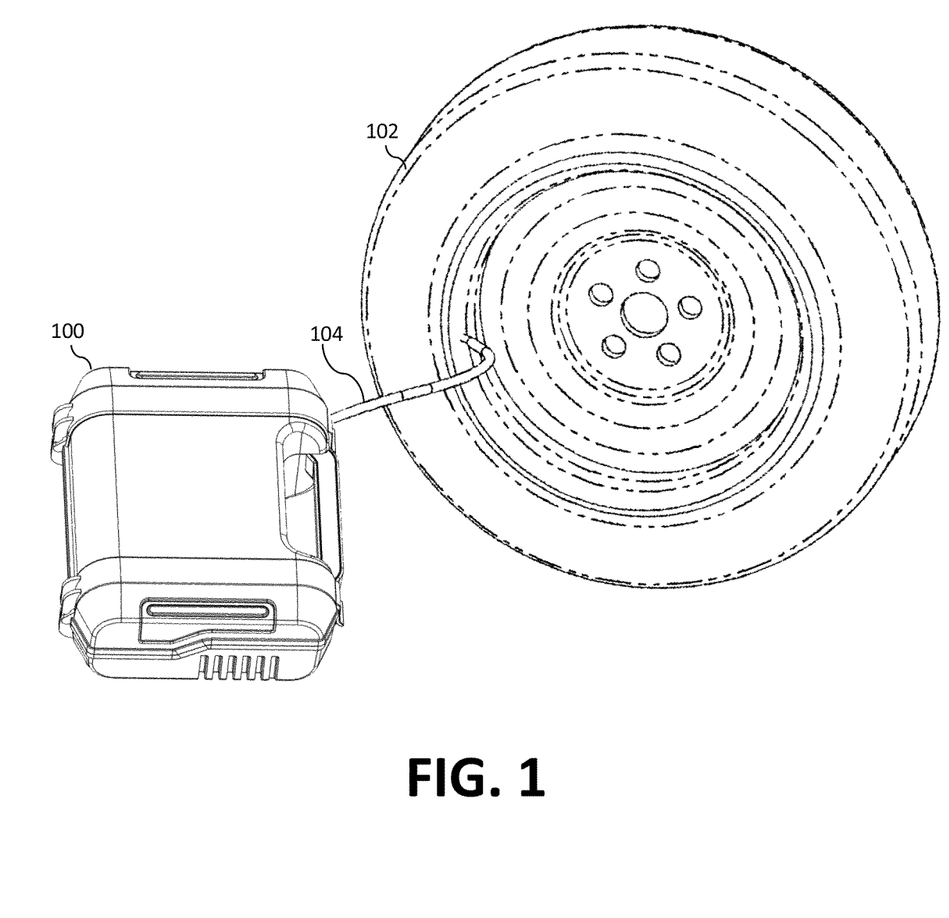
FIG. 1 illustrates a tire repair system in accordance with an aspect of this disclosure being used to seal and/or inflate a tire.

FIG. 1 illustrates a tire repair system 100 in accordance with an aspect of this disclosure being used to seal and/or inflate a tire 102, such as an automobile tire. In the illustrated example, the tire repair system 100 may be coupled to the tire 102 via a hose 104. As will be discussed, the hose 104 may inject compressed gas (e.g., air) and a sealant from a sealant container (e.g., from a reservoir cartridge) into the tire 102 in order to repair the tire 102 and re-inflate the tire 102. In some examples, the tire repair system 100 may be used in a first mode of operation in which both compressed air and sealant are injected into the tire 102 or a second mode of operation in which only compressed air from the compressor is injected into the tire 102. The tire repair system 100 may use any type of sealant (e.g., emergency tire sealant) including, for example, Slime™ brand sealant.

Figure 2A:
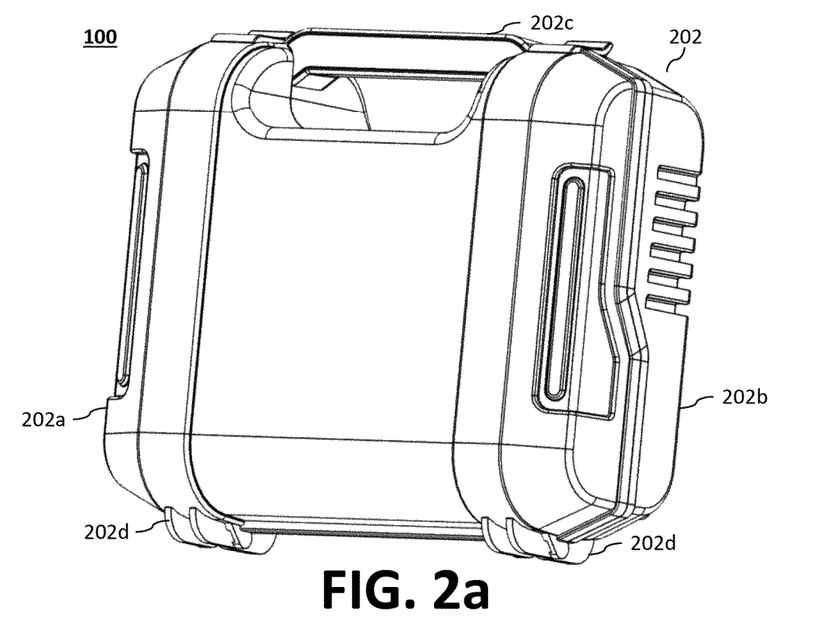
FIGS. 2a and 2b illustrate, respectively, top and bottom isometric views of the example tire repair system in a closed position.
Figure 2B:
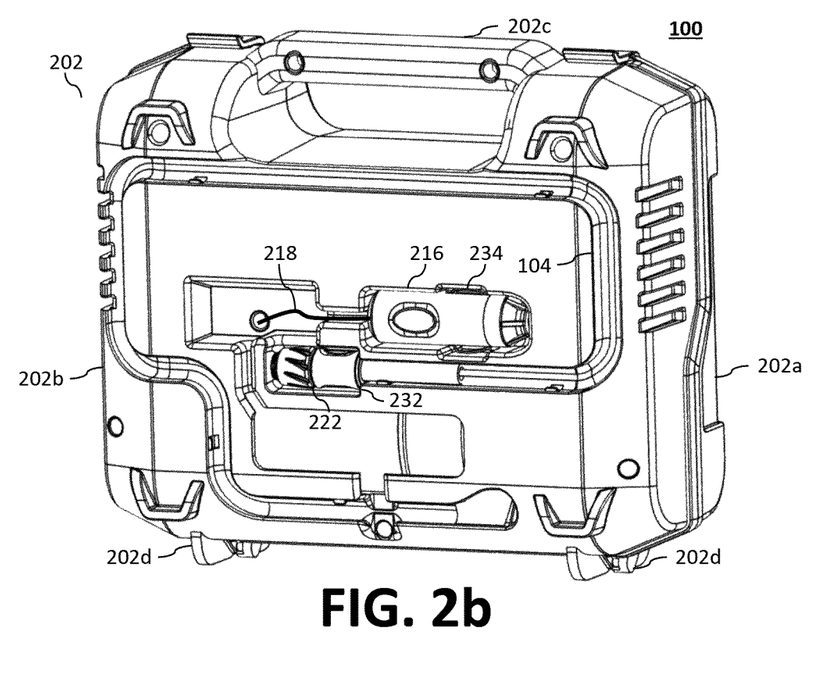
Figure 2C:
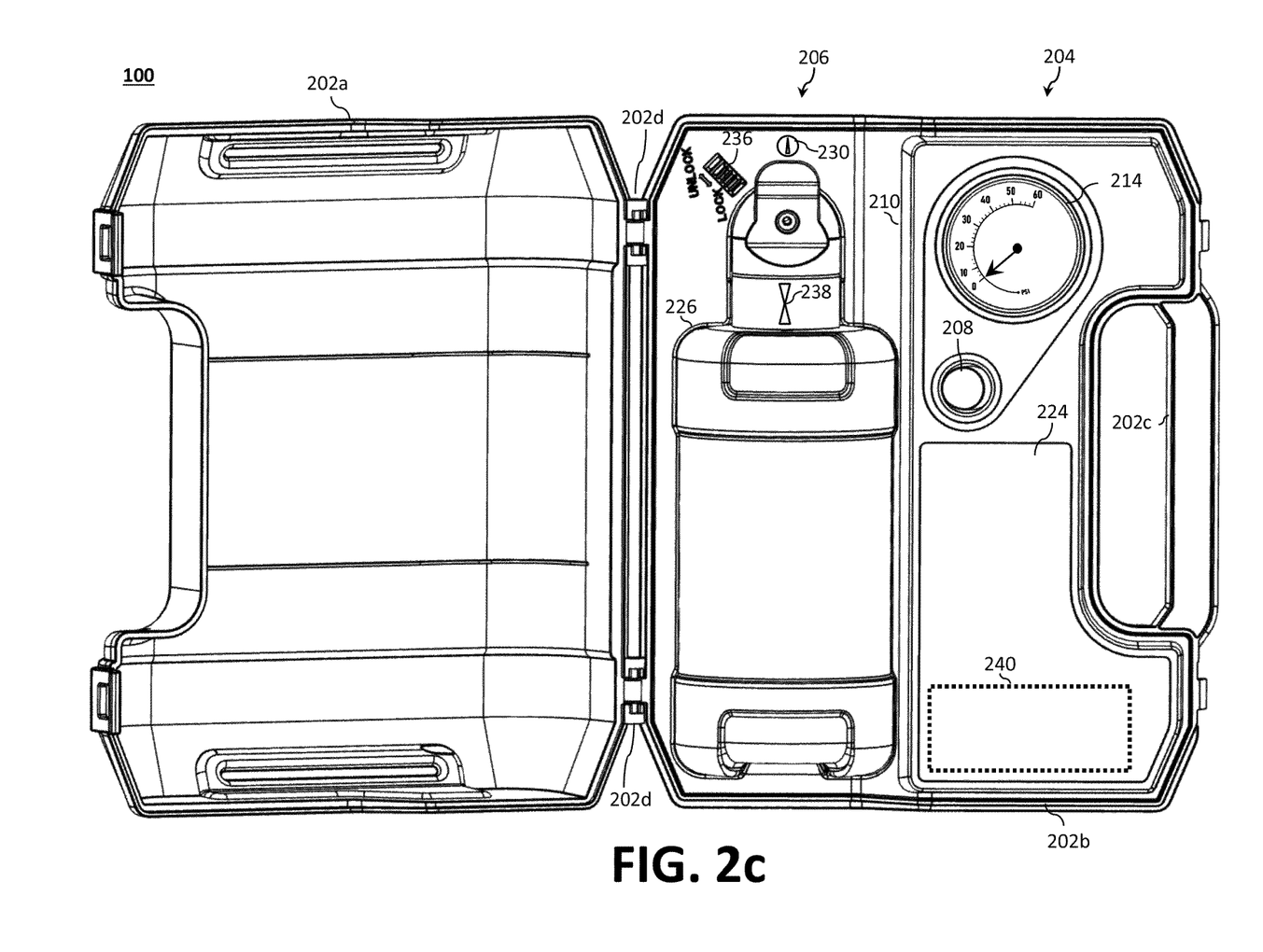
FIGS. 2c and 2d illustrate, respectively, top and bottom plan views of the example tire repair system in an open position.
Figure 2D:
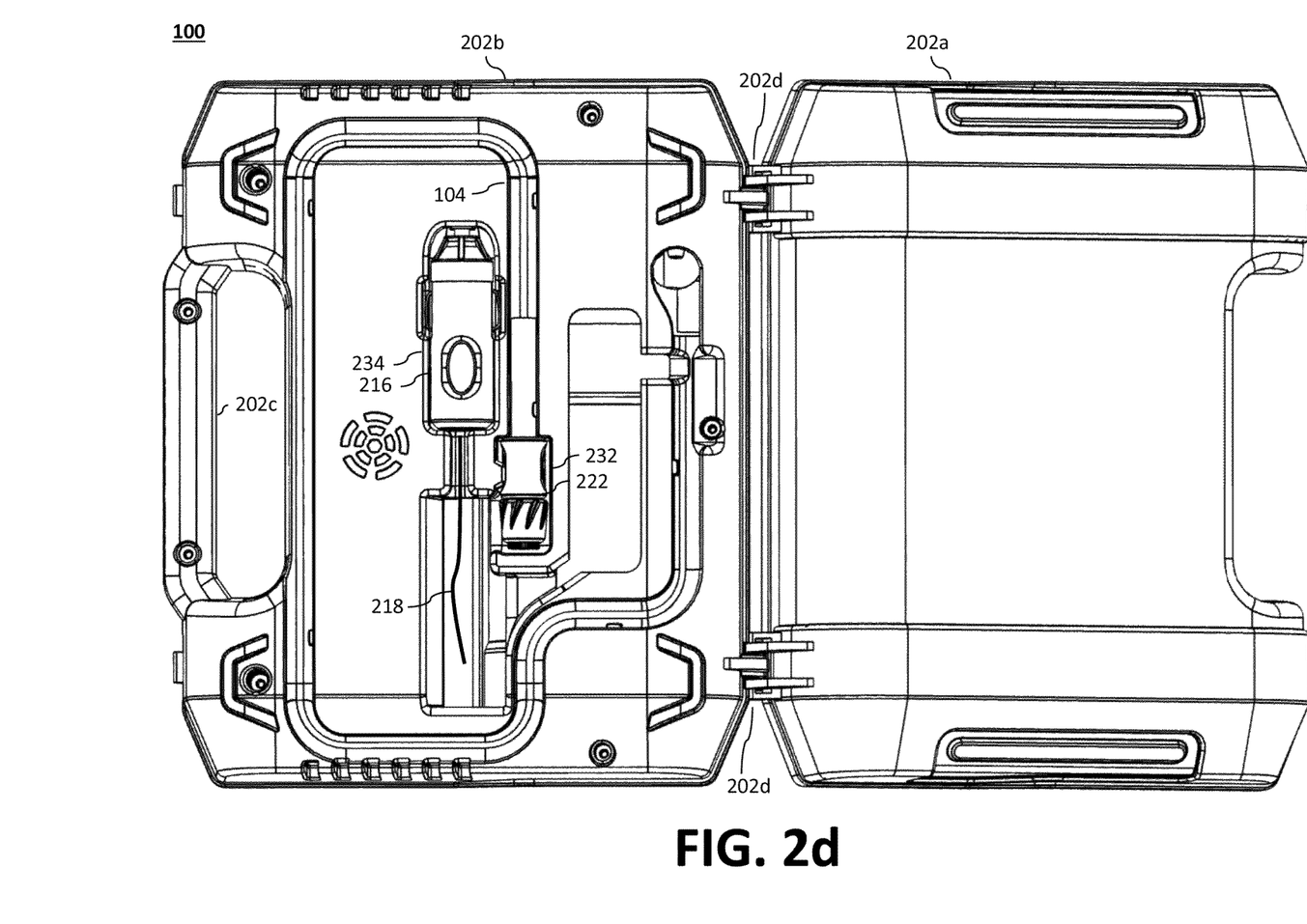

FIGS. 2a and 2b illustrate, respectively, top and bottom isometric views of an example tire repair system 100 in a closed position in accordance with an aspect of this disclosure. FIGS. 2c and 2d illustrate, respectively, top and bottom plan views of the example tire repair system 100 in an open position.

As illustrated, the various components of the tire repair system 100 are positioned in and/or integrated with a carrying case 202. The carrying case 202 is illustrated as a clam-shell style carrying case 202 with an upper housing 202a hingedly coupled to a lower housing 202b via one or more hinges 202d. In some examples, the carrying case 202 includes an integrated carry handle 202c. The integrated carry handle 202c may be formed as part of the lower housing 202b. The carrying case 202, or components thereof, may be fabricated from a plastic material, such as acrylonitrile butadiene styrene (ABS), polypropylene (PP), polyethylene terephthalate (PET), high-density polyethylene (HDPE), polyvinyl chloride (PVC), low-density polyethylene (LDPE), polystyrene (PS), or a combination thereof. In some examples, one or more components are transparent (e.g., clear, translucent, etc.). For example, the upper housing 202a may be transparent to enable the user to observe and/or monitor the internal components during operation, such as the remaining volume of sealant. While a plastic material is described, other materials can be used, such as metal.

The carrying case 202 generally houses an inflation system 204 and a sealant delivery system 206 that work in concert to inflate and/or repair the tire 102, such as a punctured automobile tire. The sealant is propelled into the inflatable tire 102 in order to repair a puncture in the tire 102. The tire repair system 100 may further include one or more controls, such as a start button 208, in or on the carrying case 202 that control the operation of the tire repair system 100. In some examples, the tire repair system 100 repairs the tire 102 and fully inflates the tire 102 using the inflation system 204 and the sealant delivery system 206 via a single press of the start button 208.

Figure 2E:
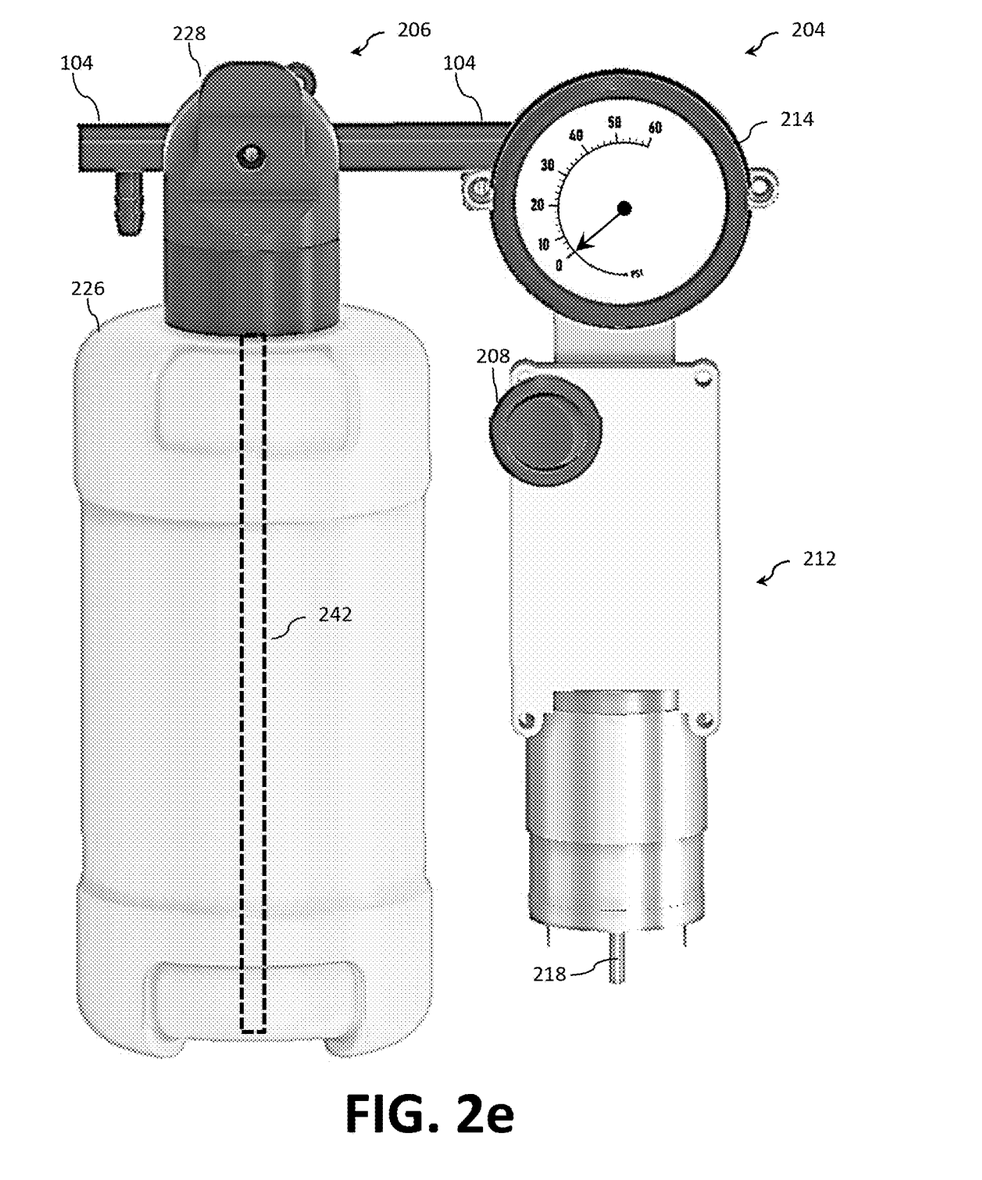
FIG. 2e illustrates the major components of the inflation system and the sealant delivery system separate from the carrying case.

Certain components of the inflation system 204 may be positioned within or behind a housing 210 of the carrying case 202 (e.g., a sub panel, cover, etc.) to, for example, improve aesthetics and/or to provide a surface upon which instructions may be provided. Therefore, for purposes of illustration, FIG. 2e illustrates portions of the inflation system 204 and the sealant delivery system 206 separate from the carrying case 202.

The illustrated inflation system 204 generally comprises a compressor 212, a gauge 214, and the start button 208. In some examples, the compressor 212 can couple electrically to the vehicle via an electrical plug 216 and cable 218 to derive power needed to operate the tire repair system 100. The compressor 212 can be a small 12V DC gear-driven, piston-type compressor. In one example, the compressor 212 is configured to receive power from a standard 12-volt accessory outlet of the vehicle. In other examples, the compressor 212 can also use 12V DC motor direct drive piston-type compressors, 120V AC powered compressors, and diesel motor driven truck air compressors. In yet other examples, the compressor 212 can use a 5V DC supply from, for example, a universal serial bus (USB) port. To that end, while the electrical plug 216 is illustrated as a connector for an automobile auxiliary power outlet (also known as car cigarette lighter or auxiliary power outlet), other connector formats and configurations are contemplated, such as USB connectors, barrel plugs, etc.

Additionally or alternatively, a rechargeable battery pack 240 can be integrated with the carrying case 202 to power the various components, such as the compressor 212. The rechargeable battery pack 240 may be a rechargeable lithium battery for outputting a direct current (DC) voltage. Example lithium battery chemistries include lithium iron phosphate ($LiFePO_4$), lithium polymer (Li-poly), lithium-cobalt oxide ($LiCoO_2$), lithium-titanate, lithium-nickel manganese cobalt oxide ($LiNiMnCoO_2$ or NMC), lithium iron magnesium phosphate ($LiFeMgPO_4$), lithium-manganese oxide ($LiMnO_2$), lithium ion manganese oxide ($LiMn_2O_4$, $Li_2MnO_3$, or LMO), etc. Other metal battery chemistries are possible, for example, aluminum-ion batteries.

The rechargeable battery pack 240 need not be limited to a single battery or single battery cell. For example, lithium iron phosphate batteries typically have a nominal cell voltage of about 3.2V to 3.3V each, while lithium-titanate batteries have a nominal cell voltage of about 2.4 V. Accordingly, multiple lithium cells may be connected in series to achieve a desired nominal voltage for the rechargeable battery pack 240. For example, where the nominal cell voltage is 3.2V to 3.3V, four cells may be connected to achieve a nominal 12-volt accessory voltage of 12.8V to 13.2V.

The rechargeable battery pack 240 may be recharged via, for example, the electrical plug 216. Providing a rechargeable battery pack 240 allows for operation of the tire repair system 100 when power is unavailable, which may be the case of non-motorized vehicles (e.g., trailers, bicycles, wagons, hand trucks, etc.) or when the vehicle has a discharged battery.

The compressor 212 is configured to provide compressed air (and, where applicable, tire sealant) to the tire via the hose 104 and a hose attachment 222. The hose attachment 222 may include a screw valve that connects to the tire 102 (e.g., via a valve stem of the tire 102). The screw valve of the hose attachment 222 opens when attached to the tire 102 and closes when disconnected from the tire 102 to prevent spray and dripping of compressed air and the sealant fluid.

In the illustrated example, the compressed air is first passed through the sealant delivery system 206 where it mixes with tire sealant prior to delivery to the tire 102. The gauge 214 is configured to display the status of the tire repair system 100 and/or the pressure in the tire 102, usually measured in pounds per square inch (psi). The gauge 214 provides, for example, the pressure of the tire 102 so that the user of the device can inflate the tire 102 to the proper pressure as over-inflation and/or under-inflation are detrimental to the tire 102.

As illustrated, a display device 224 can be positioned in or on the housing 210 to guide the operator when using the tire repair system 100. The display device 224 may be passive (e.g., printed matter, a placard, a sticker, etc.) or active (e.g., a light-emitting diode (LED) display, a liquid-crystal display (LCD) display, etc.). In some examples, such as the situation of a display device 224 that is active, the display device 224 may provide information in addition to or in lieu of the display gauge 214.

The illustrated sealant delivery system 206 generally comprises a reservoir cartridge 226 and a coupling valve 228. The reservoir cartridge 226, illustrated as a sealant bottle, is configured to house a volume of tire sealant. In some examples, the reservoir cartridge 226 may store 20 ounces or more of emergency tire sealant; thought smaller volumes can be employed for other applications. In one example, the reservoir cartridge 226 may store 14 to 18 ounces of emergency tire sealant. The reservoir cartridge 226 may be removably coupled to the tire repair system 100 via the coupling valve 228 to allow for the reservoir cartridge 226 to be refilled and/or replaced once depleted. In some examples, a switch 236, illustrated as a slider switch, can be slid form a locked position toward an unlocked position to release or otherwise disengage the reservoir cartridge 226 from the carrying case 202. While the switch 236 is illustrated as a slider switch in this example, a spring-loaded lever may be employed instead (an example of which is illustrated and described in connection with FIGS. 3a and 3b).

The reservoir cartridge 226 is fluidly coupled to the hose 104 via the coupling valve 228 to allow for the tire sealant to mix with the compressed air from the inflation system 204 prior to delivery to the tire via the hose 104 and the hose attachment 222. As best illustrated in FIG. 2e, the hose 104 is connected to the sealant delivery system 206 by the coupling valve 228. That is, the coupling valve 228 is configured to couple the reservoir cartridge 226 to the sealant delivery system 206 so that sealant may be injected into the tire 102 with the compressed air and the coupling valve 228 that couples the reservoir cartridge 226 to the tire repair system 100. In some examples, rather than relying on gravity, the tire repair system 100 is configured to draw sealant from the reservoir cartridge 226 via a dip tube 242 (represented in dotted lines) configured to draw sealant from the bottom and/or lowest point of the reservoir cartridge 226. The sealant can be drawn or pushed through the dip tube 242 using, for example, the compressed air.

In operation, when the reservoir cartridge 226 is coupled to the device as illustrated, compressed gas from the inflation system 204 passes through the coupling valve 228 into the reservoir cartridge 226 and then exits the reservoir cartridge 226 with the sealant through the hose 104 when the hose 104 is connected to the tire 102. In this manner, the sealant does not comes into contact with the inflation system 204. Back flow can be prevented using a valve 238 in the coupling valve 228, such as a ball check valve. In addition, ball valve 238 ensures that, when not in operation, the sealant is sealed (by the ball valve) so that the sealant in the reservoir cartridge 226 does not harden or leak.

The sealant delivery system 206 can also include a cutoff valve 230 to disable the sealant delivery system 206 when not in use. The cutoff valve 230 can be in addition to, in lieu of, or combined with the valve 238. The cutoff valve 230 may use a knob, dial, switch, or the like. The cutoff valve 230 is positioned fluidly between the reservoir cartridge 226 and the hose 104. For example, to avoid unwanted discharge of tire sealant and/or to inflate a tire without delivering tire sealant, the cutoff valve 230 may be moved from an open position (e.g., the first mode of operation) to a closed position (e.g., the second mode of operation). Therefore, the cutoff valve 230 can be used to select the mode of operation of the tire repair system 100 by switching the cutoff valve 230 between the air-only operation and the air and sealant mode of operation so that the tire repair system 100 may be used to inflate an tire 102 and/or repair and inflate a damaged tire 102. Therefore, the cutoff valve 230 can be configured to switch the tire repair system 100 between the first mode of operation and the second mode of operation, where only compressed air is provided in the first mode of operation and both compressed air and sealant are provided in the second mode of operation.

As best illustrated in FIG. 2d, the carrying case 202 may be formed with one or more exterior recesses or pockets to retain components of the tire repair system 100. Each of the one or more exterior recesses includes a clip, pressure fitting, or the like to secure a desired element. For example, the lower housing 202b can define a hose attachment recess 232 configured to retain the hose attachment 222 and an electrical plug recess 234 configured to retain the electrical plug 216. Storing the electrical plug 216 and/or the hose attachment 222 on an external surface enables the operator to use the tire repair system 100 without having to open the carrying case 202. To that end, while the start button 208 is illustrated within a cavity/volume of the carrying case 202, in some examples, the start button 208 may likewise be positioned on an exterior surface or otherwise accessible from the exterior. In one example, the start button 208 is position on an external surface of the lower housing 202b, such as the sides or backside. In another example, the upper housing 202a, which may be transparent, may be fabricated with a button-extender assembly that, when engaged, advances a post, a rod, or otherwise into a cavity of the carrying case 202 to engage the start button 208.

Figure 3A:
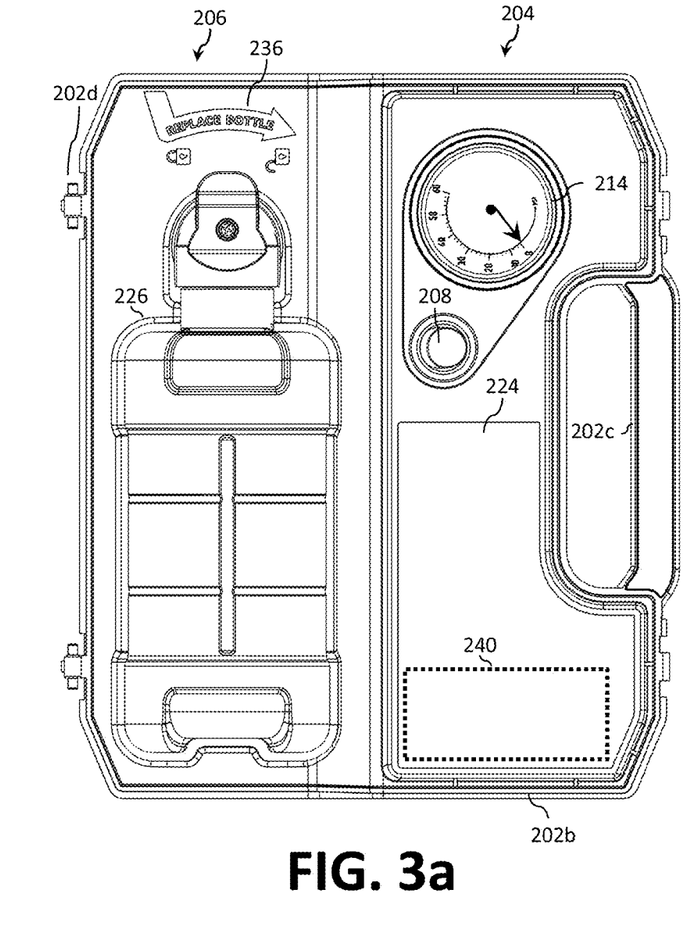
FIGS. 3a and 3b illustrate, respectively, top and bottom plan views of the example tire repair system in accordance with an another aspect of this disclosure.
Figure 3B:
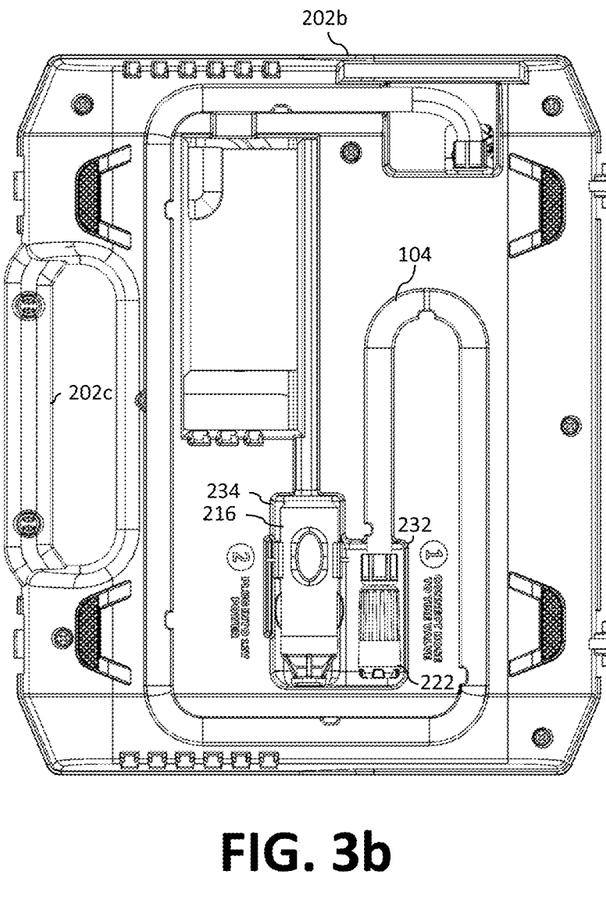

FIGS. 3a and 3b illustrate, respectively, top and bottom plan views of the example tire repair system 100 in accordance with an another aspect of this disclosure. In this example, the tire repair system 100 is illustrated with the upper housing 202a detached from the lower housing 202b via the one or more hinges 202d. The tire repair system 100 of FIGS. 3a and 3b is substantially the same as the tire repair system 100 of FIGS. 2a through 2d and the components are number accordingly, but with certain exception.

As best illustrated in FIG. 3a, the switch 236 can be provided as a spring-loaded lever instead of the slider switch illustrated in FIG. 2c. In addition, the indicia (e.g., numerals, arrows, etc.) of the display gauge 214 can be oriented such that the display gauge 214 is more easily viewed from the edge of the lower hosing 202b having the integrated carry handle 202c positioned or formed thereon. Further, certain components can be stowed or arranged differently (e.g., on the lower housing 202b). For example, with reference to FIG. 3b, the hose attachment recess 232 and the electrical plug recess 234 can be positioned such that they are adjacent one another. Such an arrangement can enable to operator to more easily detach or otherwise remove the electrical plug 216 and/or the hose attachment 222 from the lower housing 202b. In some examples, a single, larger, recess can be formed to serve as both the hose attachment recess 232 and the electrical plug recess 234.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed:

1. A tire repair system for inflating or repairing a tire, the tire repair system comprising:
   a carrying case, wherein the carrying case includes an upper housing hingedly coupled to a lower housing via one or more hinges, wherein the upper housing is transparent;
   an inflation system positioned in or integrated with the carrying case, wherein the inflation system is configured to provide compressed air;
   a sealant delivery system positioned in or integrated with the carrying case, wherein the sealant delivery system is configured to mix a tire sealant with the compressed air, wherein the sealant delivery system comprises a reservoir cartridge;
   a hose attachment configured to engage the tire and to deliver the tire sealant and the compressed air to the tire;
   a hose, wherein reservoir cartridge is fluidly coupled to the hose; and
   a dip tube extending into the reservoir cartridge, wherein the tire repair system is configured to push or draw sealant from the reservoir cartridge via the dip tube using the compressed air.

2. The tire repair system of claim 1, wherein the carrying case is formed with an exterior recess to retain a component of the tire repair system.

3. The tire repair system of claim 1, wherein the carrying case is formed with a hose attachment recess to retain the hose attachment.

4. The tire repair system of claim 1, wherein the inflation system comprises an electrical plug configured to couple electrically to a 12-volt accessory outlet of a vehicle.

5. The tire repair system of claim 1, wherein the carrying case is formed with an electrical plug recess to retain the electrical plug.

6. The tire repair system of claim 1, wherein the inflation system comprises a gauge that is configured to display a pressure of the tire.

7. The tire repair system of claim 1, wherein the inflation system comprises a start button.

8. The tire repair system of claim 1, wherein the sealant delivery system comprises a coupling valve.

9. The tire repair system of claim 8, wherein the reservoir cartridge is removably coupled via the coupling valve.

10. The tire repair system of claim 9, further comprising a switch configured to disengage the reservoir cartridge from the carrying case.

11. The tire repair system of claim 1, further comprising a rechargeable battery pack positioned in or integrated with the carrying case, wherein the rechargeable battery pack is configured to power the inflation system.

12. The tire repair system of claim 1, wherein the inflation system comprises an electrical plug configured to couple electrically to a universal serial bus port.

13. A tire repair system for inflating or repairing a tire, the tire repair system comprising:
   a carrying case, wherein the carrying case includes an upper housing hingedly coupled to a lower housing via one or more hinges, wherein the upper housing is transparent;
   an inflation system positioned in or integrated with the carrying case, wherein the inflation system is configured to provide compressed air;
   a sealant delivery system positioned in or integrated with the carrying case, wherein the sealant delivery system is configured to mix a tire sealant with the compressed air, wherein the sealant delivery system comprises a reservoir cartridge;
   a hose attachment configured to engage the tire and to deliver the tire sealant and the compressed air to the tire;
   a hose, wherein reservoir cartridge is fluidly coupled to the hose an electrical plug configured to couple electrically to a 12-volt accessory outlet of a vehicle; a gauge that is configured to display a pressure of the tire; and
   a dip tube extending into the reservoir cartridge, wherein the tire repair system is configured to push or draw sealant from the reservoir cartridge via the dip tube using the compressed air.

14. The tire repair system of claim 13, further comprising a rechargeable battery pack positioned in or integrated with the carrying case, wherein the rechargeable battery pack is configured to power the inflation system.

15. A tire repair system for inflating or repairing a tire, the tire repair system comprising:
   a carrying case, wherein the carrying case includes an upper housing hingedly coupled to a lower housing via one or more hinges, wherein the upper housing is transparent;
   an inflation system positioned in or integrated with the carrying case, wherein the inflation system is configured to provide compressed air;
   a sealant delivery system positioned in or integrated with the carrying case, wherein the sealant delivery system is configured to mix a tire sealant with the compressed air, wherein the sealant delivery system comprises a reservoir cartridge;

a hose attachment configured to engage the tire and to deliver the tire sealant and the compressed air to the tire;

a hose, wherein reservoir cartridge is fluidly coupled to the hose;

a dip tube extending into the reservoir cartridge, wherein the tire repair system is configured to push or draw sealant from the reservoir cartridge via the dip tube using the compressed air an electrical plug configured to couple electrically to a universal serial bus port; and a rechargeable battery pack positioned in or integrated with the carrying case, wherein the rechargeable battery pack is configured to power the inflation system.

* * * * *